(12) United States Patent
Okumura

(10) Patent No.: US 7,907,825 B2
(45) Date of Patent: Mar. 15, 2011

(54) IMAGE RECORDING DEVICE AND IMAGE RECORDING-CONTROL METHOD FOR MATCHING A MENU TO ADDITIONAL RECORDED DATA

(75) Inventor: Atsushi Okumura, Tokyo (JP)

(73) Assignee: Sony Corporation, Tokyo (JP)

( * ) Notice: Subject to any disclaimer, the term of this patent is extended or adjusted under 35 U.S.C. 154(b) by 489 days.

(21) Appl. No.: 10/588,033

(22) PCT Filed: Nov. 18, 2005

(86) PCT No.: PCT/JP2005/021276
§ 371 (c)(1),
(2), (4) Date: Oct. 1, 2007

(87) PCT Pub. No.: WO2006/061984
PCT Pub. Date: Jun. 15, 2006

(65) Prior Publication Data
US 2008/0123499 A1    May 29, 2008

(30) Foreign Application Priority Data

Dec. 9, 2004    (JP) .................................. 2004-357464

(51) Int. Cl.
*H04N 5/93* (2006.01)
(52) U.S. Cl. ............... 386/288; 369/53.41; 386/E5.061; 386/224
(58) Field of Classification Search ............ 386/52, 386/64, 124–126, 46, E5.061; 369/53.41
See application file for complete search history.

(56) References Cited

U.S. PATENT DOCUMENTS

| 7,580,935 B2 * | 8/2009 | Wyllie ........................... 707/10 |
| 2002/0012304 A1 * | 1/2002 | Nakahara et al. .......... 369/53.24 |
| 2003/0147629 A1 * | 8/2003 | Kikuchi et al. ................. 386/69 |
| 2003/0227474 A1 * | 12/2003 | Oetzel et al. .................. 345/716 |
| 2006/0077843 A1 * | 4/2006 | Ko et al. ...................... 369/53.2 |

FOREIGN PATENT DOCUMENTS

JP    07-122033    5/1995
(Continued)

OTHER PUBLICATIONS

Search Report and Written Opinion dated Jan. 22, 2007 from the Danish Patent and Trademark Office in a corresponding application.

*Primary Examiner* — David E Harvey
(74) *Attorney, Agent, or Firm* — Finnegan, Henderson, Farabow, Garrett & Dunner, L.L.P.

(57) ABSTRACT

In an image-recording device using a disk-type recording medium generated under the DVD+RW standard, a disk information-acquisition unit 250 acquires information about a disk 49, a disk-determination unit 260 determines that the disk 49 is a subject disk that is of a DVD+RW type and that stores video data generated by using a DVD menu and/or still-image data recorded onto the disk, an additional recording-control unit 220 controls additional recording performed for the disk 49 according to a result of the determination performed by the disk-determination unit 260, and a message display-control unit 270 makes a display unit 280 show a confirmation message used for shifting to a mode relating to the pros and cons of performing the additional recording and/or a message adapted to confirm that the DVD menu and the video data are updated, so that a mismatch which may occur between the DVD menu and/or the video data, and recorded image data is reduced.

25 Claims, 14 Drawing Sheets

| | FOREIGN PATENT DOCUMENTS | | JP | 2004-318923 | 11/2004 |
|---|---|---|---|---|---|
| JP | 08-045131 | 2/1996 | JP | 2005-303907 | 10/2005 |
| JP | 2004-120035 | 4/2004 | | | |
| JP | 2004-201170 | 7/2004 | * cited by examiner | | |

(a)

| BYTE POSITION | DESCRIPTION | BYTE NUMBER | |
|---|---|---|---|
| 0 | DISK TYPE AND VERSION NUMBER | 1 | 411 |
| 1 | DATA SIZE AND MAXIMUM TRANSFER RATE | 1 | 412 |
| 2 | DISK STRUCTURE | 1 | 413 |
| 3 | RECORD DENSITY | 1 | 414 |
| 4~15 | DATA-ZONE ASSIGNMENT | 12 | 415 |
| 16 | BCA DESCRIPTOR | 1 | 416 |
| 17~31 | (RESERVATION AREA) | 15 | 417 |
| 32~2047 | | 2016 | 418 |

(b)

FIG. 14
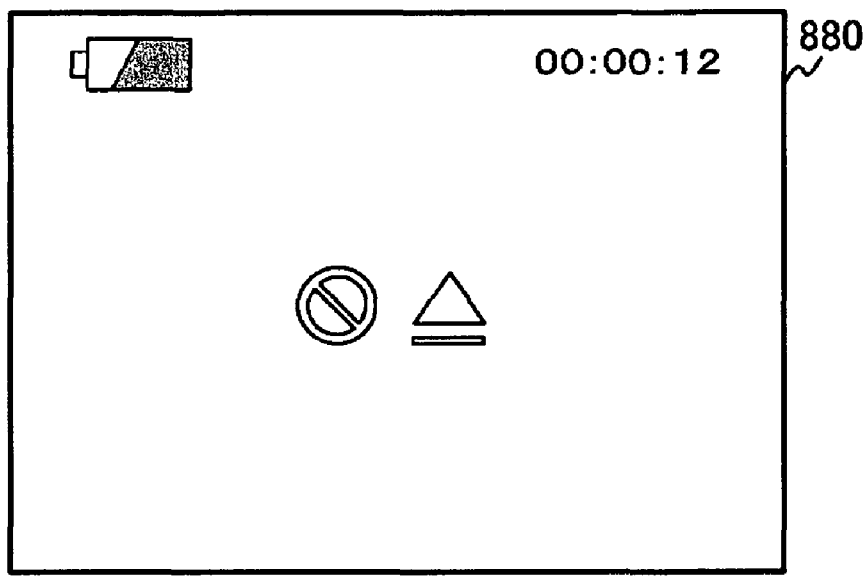
PRESS DOWN RECORD BUTTON
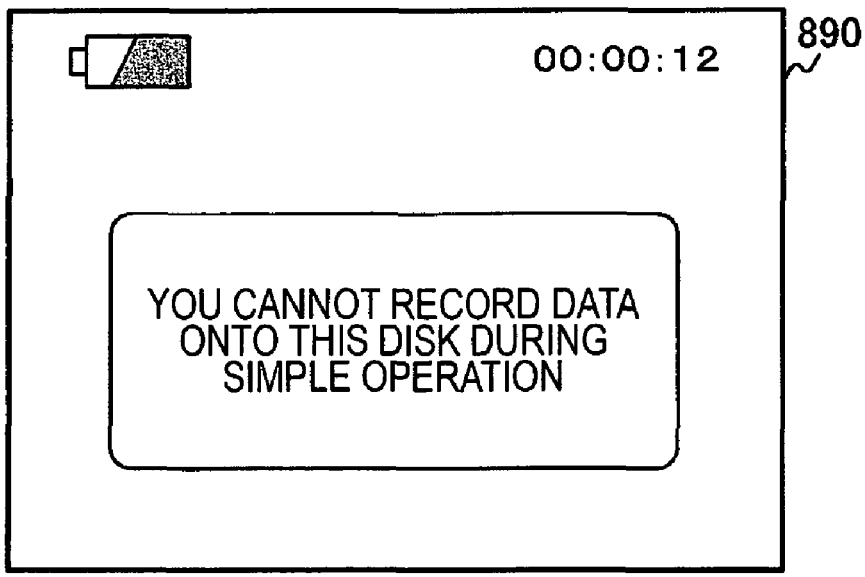

IMAGE RECORDING DEVICE AND IMAGE RECORDING-CONTROL METHOD FOR MATCHING A MENU TO ADDITIONAL RECORDED DATA

TECHNICAL FIELD

The present invention relates to an image-recording device and particularly relates to an image-recording device which holds a predetermined menu relating to recorded image data, an image recording-control method, and a program which makes a computer execute the image recording-control method.

BACKGROUND ART

In recent years, as disk-type recording mediums such as a digital versatile disk (DVD) become widespread, the disk-type recording medium is increasingly used in place of a known tape-type recording medium in mobile-image recording devices such as a digital video camera. The disk-type recording medium is adaptable to random access. In the image-recording device using the disk-type recording medium, therefore, recorded image data can be easily reproduced and/or deleted in predetermined units.

In the case of the DVD, a menu screen referred to as a DVD menu is provided, as a user interface which allows for accessing recorded video data. In the DVD menu, representative images of the video data are shown in titles and/or chapters of the DVD, as thumbnails.

On the other hand, an image-recording device that can record not only video images but also still images often holds video data referred to as a photo movie. The photo movie shows the recorded still images in sequence and produces predetermined background music at the same time. When the photo movie exists, it is shown as the last video image of the DVD menu.

Incidentally, the type of a DVD that can record data includes the DVD-R standard that allows for recording data onto a single area only once, the DVD-RW standard and the DVD+RW standard that allow for repetitive data rewriting, and so forth. In the case of the above-described DVD that can record data, finalization is performed, so as to generate the DVD menu and the photo movie (For example, refer to Japanese Unexamined Patent Application Publication No. 2004-201170 (FIG. 7).).

DISCLOSURE OF INVENTION

After the finalization processing is performed for DVDs generated under the DVD-R standard and/or the DVD-RW standard of the data-recordable DVDs, additional image data cannot be recorded thereon. For recording the additional image data onto the DVDs generated under the DVD-R standard and/or the DVD-RW standard, unfinalization processing needs to be performed, so as to undo the finalization processing.

However, according to a video-recording format used for the DVD+RW standard (DVD+RW video-recording format), additional image data can be recorded thereon after the finalization processing is performed. Therefore, it is possible to perform additional recording while the existing DVD menu and photo movies are left untouched. In that case, a mismatch may occur between the DVD menu and/or the photo movie, and image data which is actually recorded. Subsequently, matching of some kind should be performed between the DVD menu and/or the photo movie, and the image data, so as to record additional image data onto the disk generated under the DVD+RW standard.

Accordingly, an object of the present invention is to reduce a mismatch that may occur between a DVD menu and/or a photo movie, and image data in an image-recording device using a disk-type recording medium generated under the DVD+RW standard.

For achieving the above-described object, an image-recording device according to a first aspect of the present invention includes a disk-determination unit which determines whether or not an inserted disk is a subject disk that is of a predetermined type and that stores a predetermined menu, and an additional recording-control unit which makes matching for additionally recorded data performed when the disk-determination unit determines the inserted disk to be the subject disk. Subsequently, when the predetermined menu is recorded onto the disk of the predetermined type, the matching for the additionally recorded data is performed.

Further, an image-recording device according to a second aspect of the present invention includes a disk-determination unit which determines whether or not an inserted disk is a subject disk that is of a DVD+RW type and that stores a predetermined menu, and an additional recording-control unit which makes matching for additionally-recorded data performed when the disk-determination means determines the inserted disk to be the subject disk. Subsequently, when the disk type is the DVD+RW and the predetermined menu is recorded onto the disk, the matching for the additionally recorded data is performed.

Further, according to the second aspect, the disk-determination unit may determine the inserted disk to be the subject disk when a recording format of the inserted disk is a DVD+RW video-recording format. Subsequently, when the recording format is the DVD+RW video-recording format, the matching for the additionally recorded data is performed.

Further, according to the second aspect, the above-described predetermined menu may be a DVD menu holding a list of video data items recorded onto the inserted disk and/or a photo movie which holds still-image data recorded onto the inserted disk, as video images. The DVD menu and the photo movie are generated when finalization is performed, or a user performs operations.

Further, according to the second aspect, the above-described matching is achieved by (a) deleting the predetermined menu when additional data is recorded onto the inserted disk, (b) updating the predetermined menu on the basis of the additionally recorded data when the additional data is recorded onto the inserted disk and an instruction to take out the disk is issued, (c) updating the predetermined menu on the basis of the additionally recorded data after confirming that the predetermined menu should be updated when the additional data is recorded onto the inserted disk and an instruction to take out the disk is issued, and so forth.

Further, an image-recording device according to a third aspect of the present invention includes a disk-determination unit which determines whether or not an inserted disk is a subject disk that is of a DVD+RW type and that stores a predetermined menu, a message display-control unit which makes a display image produced, the display image being adapted to confirm that additional data can be recorded onto the inserted disk when the disk-determination unit determines the inserted disk to be the subject disk, an operation input-reception unit which receives a confirmation input for the confirmation display image, and an additional recording-control unit which makes matching performed for the additionally-recorded data when the confirmation input indicates that the additional data can be recorded. Subsequently, when the disk type is the DVD+RW and the predetermined menu is recorded onto the disk, the matching for the additionally recorded data is performed after it is confirmed that the additional data can be recorded.

Further, according to the third aspect, the disk-determination unit may determine the inserted disk to be the subject disk when a recording format of the inserted disk is a DVD+RW-video recording format. Subsequently, the matching for the additionally recorded data is performed when the recording format of the inserted disk the DVD+RW video-recording format.

Further, according to the third aspect, the predetermined menu may be a DVD menu holding a list of video data items recorded onto the inserted disk, or a photo movie holding still-image data recorded onto the inserted disk, as video data. The above-described DVD menu and the photo movie are generated when finalization is performed, or a user performs operations.

Further, according to the second aspect, the above-described matching is achieved by (a) deleting the predetermined menu unconditionally, (b) deleting the predetermined menu when additional data is recorded onto the inserted disk, (c) updating the predetermined menu on the basis of the additionally recorded data when the additional data is recorded onto the inserted disk and an instruction to take out the disk is issued, (d) updating the predetermined menu on the basis of the additionally recorded data after confirming that the predetermined menu should be updated when the additional data is recorded onto the inserted disk and the instruction to take out the disk is issued, and so forth.

Further, according to the third aspect, the message display-control unit may produce a display image indicating that the additional recording can be performed when at least one of the following processing procedures is performed, where the processing procedures include (1) turning on a power again when the confirmation input indicates that the additional recording cannot be performed, (2) switching to a predetermined photographing mode when the confirmation input shows that the additional recording cannot be performed, and (3) performing a predetermined photographing operation is performed when the confirmation input shows that the additional recording cannot be performed.

Further, an image-recording device according to a fourth aspect of the present invention includes a disk-determination unit which determines whether or not an inserted disk is a subject disk that is of a DVD+RW type and that stores a predetermined menu, and an additional recording-control unit which disables additional recording when the disk-determination unit determines the inserted disk to be the subject disk. Subsequently, when the disk type is the DVD+RW and the predetermined menu is recorded onto the disk, the additional recording is uniformly prohibited.

Further, according to the fourth aspect, the disk-determination unit may determine the inserted disk to be the subject disk only when a recording format of the inserted disk is a DVD+RW-video recording format. Subsequently, when the recording format is the DVD+RW video-recording format, the matching for the additionally recorded data is performed.

Further, an image recording-control method according to a fifth aspect of the present invention includes a step of determining a type of an inserted disk, a step of determining whether or not a predetermined menu is recorded onto the inserted disk, and a step of performing matching for additionally recorded data when it is determined that the type of the inserted disk is DVD+RW and the predetermined menu is recorded onto the inserted disk. Subsequently, when the disk type is the DVD+RW and the predetermined menu is recorded onto the disk, the matching for the additionally recorded data is performed.

Further, an image recording-control method according to a sixth aspect of the present invention includes a step of determining a type of an inserted disk, a step of determining whether or not a predetermined menu is recorded onto the inserted disk, a step of producing a display image adapted to confirm that additional data can be recorded onto the inserted disk when it is determined that the type of the inserted disk is DVD+RW and the predetermined menu is recorded onto the inserted disk, a step of receiving a confirmation input for the confirmation display image, and a step of performing matching for the additionally-recorded data when the confirmation input indicates that the additional data can be recorded. Subsequently, when the disk type is the DVD+RW and the predetermined menu is recorded onto the disk, the matching for the additionally recorded data is performed after it is confirmed that the additional data can be recorded.

Further, a program according to a seventh aspect of the present invention makes a computer execute a step of determining a type of an inserted disk, a step of determining whether or not a predetermined menu is recorded onto the inserted disk, and a step of matching a predetermined menu to additionally recorded data when it is determined that the type of the inserted disk is DVD+RW and the predetermined menu is recorded onto the inserted disk. Subsequently, when the disk type is the DVD+RW and the predetermined menu is recorded onto the disk, the matching for the additionally recorded data is performed.

Further, a program according to an eighth aspect of the present invention makes a computer execute a step of determining a type of an inserted disk, a step of determining whether or not a predetermined menu is recorded onto the inserted disk, a step of producing a display image adapted to confirm that additional data can be recorded onto the inserted disk when it is determined that the type of the inserted disk is DVD+RW and the predetermined menu is recorded onto the inserted disk, a step of receiving a confirmation input for the confirmation display image, and a step of matching the predetermined menu to the additionally recorded data when the confirmation input indicates that the additional data can be recorded. Subsequently, when the disk type is the DVD+RW and the predetermined menu is recorded onto the disk, the matching for the additionally recorded data is performed after it is confirmed that the additional data can be recorded.

BRIEF DESCRIPTION OF THE DRAWINGS

FIG. 14 shows example display images generated according to other embodiment of the present invention.

BEST MODE FOR CARRYING OUT THE INVENTION

Next, embodiments of the present invention will be described in detail with reference to the attached drawings.

Figure 1:
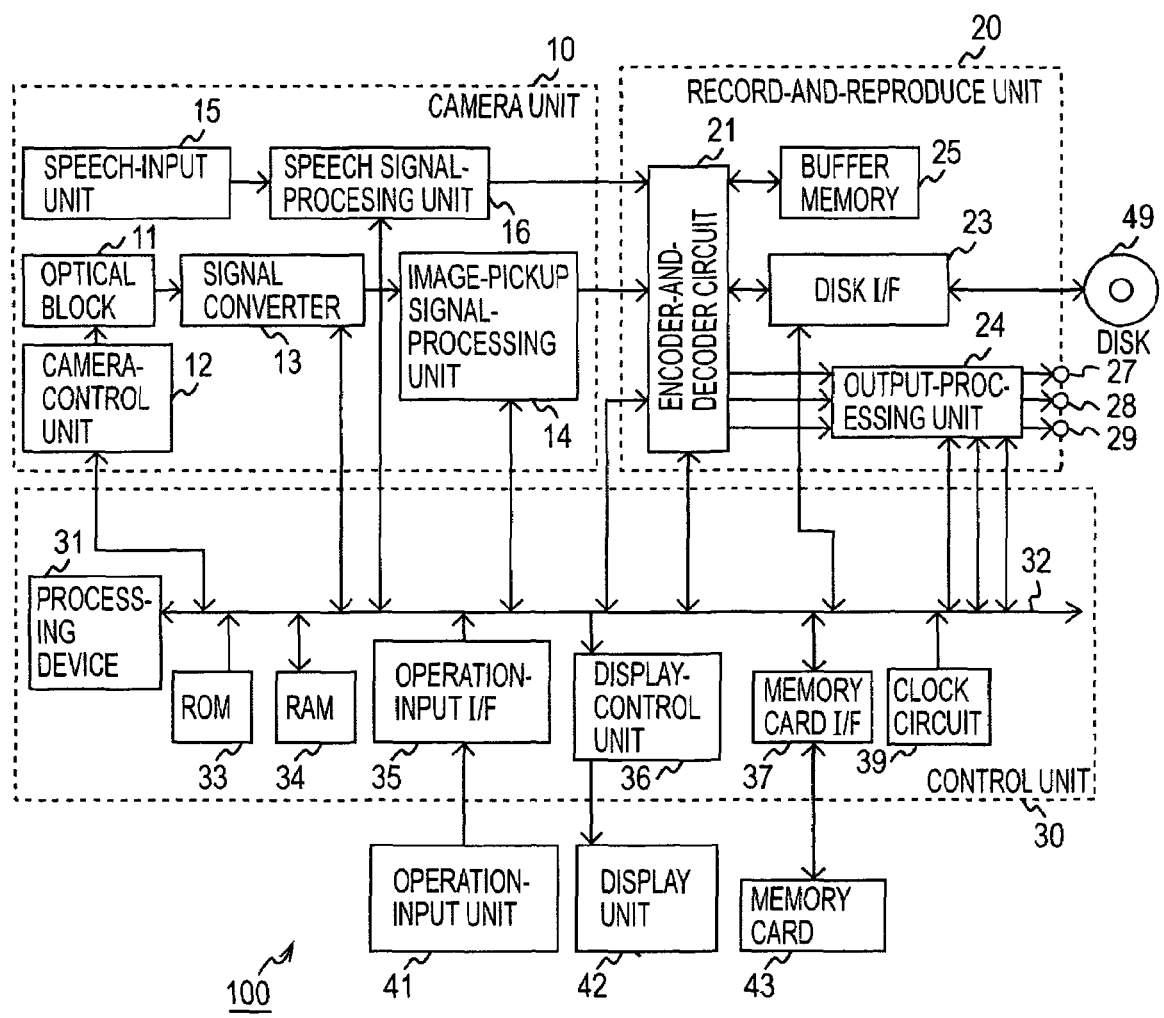
FIG. 1 shows an example configuration of an image-recording device 100 according to an embodiment of the present invention.

FIG. 1 shows an example configuration of an image-recording device 100 according to an embodiment of the present invention. The above-described image-recording device 100 includes a camera unit 10, a record-and-reproduce unit 20, and a control unit 30.

The camera unit 10 has an optical block 11, a camera-control unit 12, a signal converter 13, an image-pickup signal-processing unit 14, a speech-input unit 15, and a speech signal-processing unit 16. The optical block 11 includes a group of lenses adapted to pick up the image of a subject, an aperture-adjustment mechanism, a focus-adjustment mechanism, a zoom mechanism, a shutter mechanism, a flash mechanism, a shake-correction mechanism, and so forth. Upon receiving a control signal transmitted from the control unit 30, the camera-control unit 12 generates a control signal transmitted to the optical block 11. Then, the camera-control unit 12 transmits the generated control signal to the optical block 11 and performs control including zoom control, shutter control, exposure control, and so forth.

The signal converter 13 includes an image-pickup element such as a charge-coupled device (CCD) so that an image is generated on an image-forming face of the image-pickup element via the optical block 11. Upon receiving an image-capture-timing signal transmitted from the control unit 30 in response to a shutter operation, the signal converter 13 converts the subject image generated on the image-forming face into an image-pickup signal and transmits the image-pickup signal to the image-pickup signal-processing unit 14.

The image-pickup signal-processing unit 14 performs processing including gamma correction, auto gain control (AGC), and so forth for the image-pickup signal on the basis of the control signal transmitted from the control unit 30. Further, the image-pickup signal-processing unit 14 converts the image-pickup signal to an image signal, as a digital signal. The speech-input unit 15 collects data on speech around the subject while photographing is performed. A speech signal transmitted from the speech-input unit 15 is transmitted to the speech-signal processing unit 16. The speech-signal processing unit 16 performs processing including correction and AGC for the speech signal on the basis of the control signal transmitted from the control unit 30. Further, the speech-signal processing unit 16 converts the speech signal into a digital signal.

The record-and-reproduce unit 20 includes an encoder-and-decoder circuit 21, a disk interface 23, an output-processing unit 24, and a buffer memory 25.

The encoder-and-decoder circuit 21 has an encoding function, so as to encode and multiplex an image signal, a speech signal, and additional-recording information that are transmitted from the camera unit 10 into compressed data. Further, the encoder-and-decoder circuit 21 has a decoding function, so as to separate the image signal, the speech signal, and the additional-recording information from the compressed data, and decode the image signal, the speech signal, and the additional-recording information. Further, the encoder-and-decoder circuit 21 performs automatic-white balance control, exposure-correction control, magnification control according to digital-zoom magnification, and so forth for the image signal transmitted from the image-pickup signal-processing unit 14 on the basis of the control signal transmitted from the control unit 30.

The disk interface 23 writes the compressed data transmitted from the encoder-and-decoder circuit 21 onto a disk 49. Further, the disk interface 23 reads the compressed data from the disk 49 and transmits the compressed data to the encoder-and-decoder circuit 21. Under the control of the control unit 30, the output-processing unit 24 transmits the compressed data transmitted from the encoder-and-decoder circuit 21 to the control unit 30 and output terminals 27, 28, and 29. The buffer memory 25 includes an SDRAM or the like and is used, as a work area used for encoding and/or decoding performed by the encoder-and-decoder circuit 21.

The control unit 30 includes a processing device 31, a read-only memory (ROM) 33, a random-access memory (RAM) 34, an operation-input interface 35 adapted to connect an operation-input unit 41, a display-control unit 36 adapted to connect a display unit 42, a memory-card interface 37 into which a memory card 43 is inserted, and a clock circuit 39 adapted to record information about the photographing time that are connected via a system bus 32.

The processing device 31 controls the entire processing performed by the control unit 30 and uses the RAM 34, as a work area. A program adapted to control the camera unit 10 and a program adapted to control recording and reproducing an image signal and/or a speech signal are written into the ROM 33.

The operation-input unit 41 connected to the operation-input interface 35 has a plurality of keys including a mode-switch key adapted to switch from a photographing mode to other mode such as a reproducing mode, a zoom-adjustment key, an exposure-adjustment key, a shutter key, a video-photographing key, a key adapted to adjust a display image produced on the display unit 42, and so forth. The operation-input interface 35 transmits an operation signal transmitted from the operation-input unit 41 to the processing device 31. The processing device 31 determines which of the above-described keys of the operation-input unit 41 was operated and performs control processing according to the determination result.

The display unit 42 connected to the display-control unit 36 includes a liquid-crystal display (LCD) or the like and produces an image of an image signal transmitted from the camera unit 10 and/or an image signal read from the disk 49 under the control of the processing device 31.

The memory-card interface 37 writes the compressed data transmitted from the encoder-and-decoder circuit 21 into the memory card 43. Further, the memory-card interface 37 reads the compressed data from the memory card 43 and transmits the compressed data to the encoder-and-decoder circuit 21. The clock circuit 39 generates time information showing a year, a month, a day, time, a minute, a second, and so forth.

Figure 2:
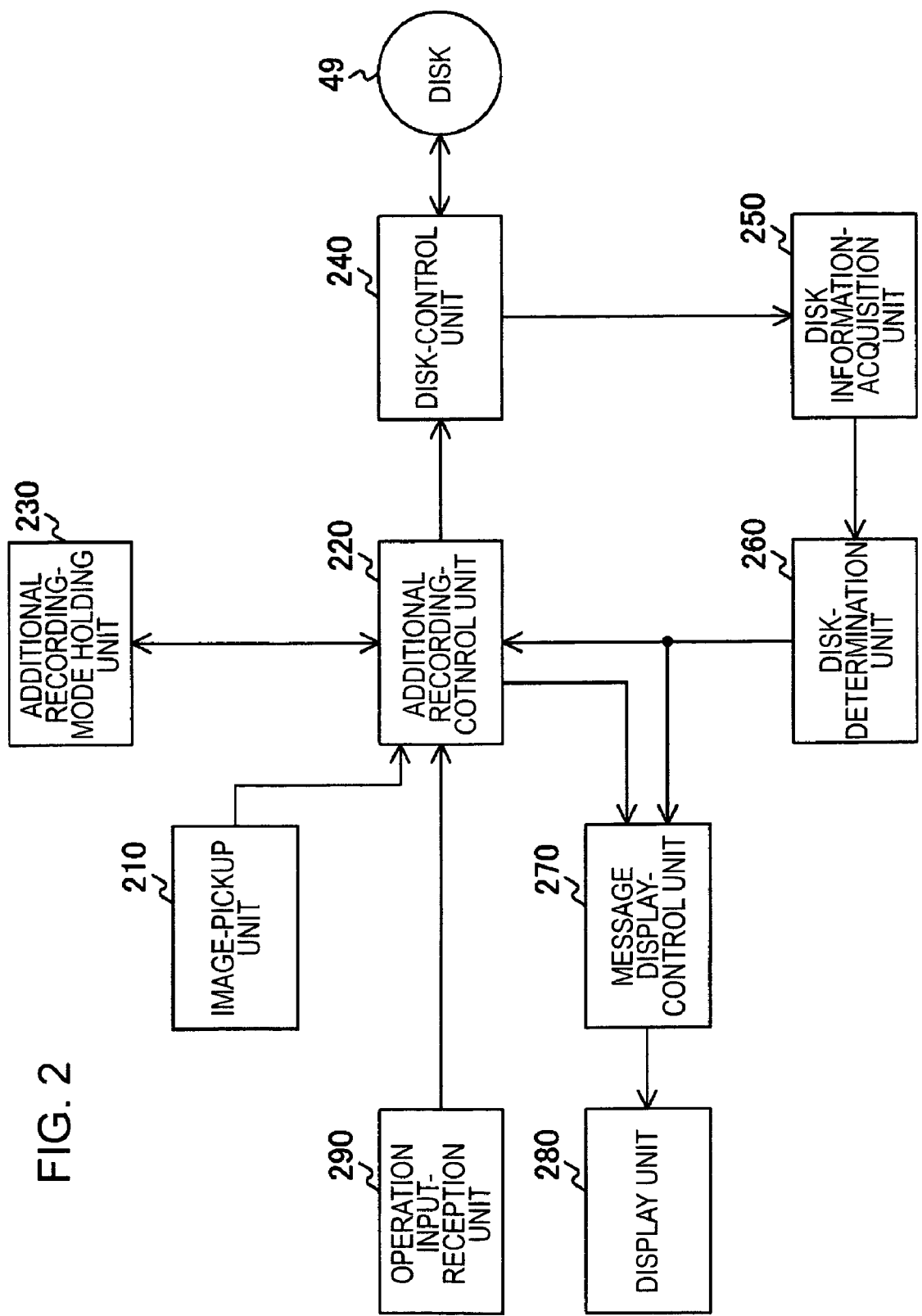
FIG. 2 shows an example functional configuration of the image-recording device 100 according to another embodiment of the present invention.

FIG. 2 shows an example functional configuration of an image-recording device 100 according to another embodiment of the present invention. Here, an image-pickup unit 210, an additional recording-control unit 220, an additional recording-mode holding unit 230, a disk-control unit 240, a disk information-acquisition unit 250, a disk-determination unit 260, a message display-control unit 270, a display unit 280, and an operation input-reception unit 290 are shown, as functions of the image-recording device 100.

The image-pickup unit 210 is adapted to pick up the image of a subject. For example, the image pickup is achieved by using the camera unit 10 shown in FIG. 1, for example. The disk-control unit 240 controls writing and reading data onto/from the disk 49, which is achieved by the record-and-reproduce unit 20 shown in FIG. 1, for example. The disk information-acquisition unit 250 acquires information relating to the disk 49 via the disk control unit 240, which is achieved by the processing device 31 shown in FIG. 1, for example.

The disk-determination unit 260 determines whether or not the disk 49 is subjected to matching performed according to another embodiment of the present invention, which is achieved by the processing device 31 shown in FIG. 1, for example. The disk-determination unit 260 determines the type, recording format, and recording state of the disk 49. More specifically, when the type of the disk 49 is DVD+RW, the recording format of the disk 49 is DVD+RW-video recording format, and a DVD menu and a photo movie are recorded onto the disk 49, the disk 49 is determined to be a disk subjected to the matching performed according to the embodiment of the present invention (Hereinafter referred to as a "subject disk".).

The additional recording-control unit 220 performs control when data is additionally recorded onto the disk 49 according to a result of the determination performed by the disk-determination unit 260. The control is achieved by using the processing device 31 shown in FIG. 1, for example. That is to say, the additional recording-control unit 220 controls each of the units, so as to perform matching adapted to prevent a mismatch which occurs between the DVD menu and/or the photo movie, and image data recorded onto the disk 49.

The additional recording-mode-holding unit 230 holds information about a mode relating to the pros and cons of performing additional recording for the disk 49, which is achieved by the RAM 34 shown in FIG. 1, for example. The mode information held in the additional recording-mode-holding unit 230 may be information about a mode adapted to allow for performing additional recording, or a mode that does not allow for performing the additional recording. To which mode a shift should be made may be determined according to an instruction and/or a permission given by a user. Otherwise, the shift may be made automatically.

The message display-control unit 270 makes the display unit 280 produce a confirmation message generated when the shift to the mode relating to the pros and cons of performing the additional recording is made, or a message adapted to confirm that the DVD menu and the photo movie are updated. The above-described processing is achieved by the display-control unit 36 shown in FIG. 1, for example. The display unit 280 produces a message under the control of the message display-control unit 270, which is achieved by the display unit 42 shown in FIG. 1, for example. The operation input-reception unit 290 receives an operation input transmitted from the user, which is achieved by the operation-input interface 35 shown in FIG. 1, for example.

Next, the details on determination made by the disk-determination unit 260 according to another embodiment of the present invention will be described.

Figure 3:
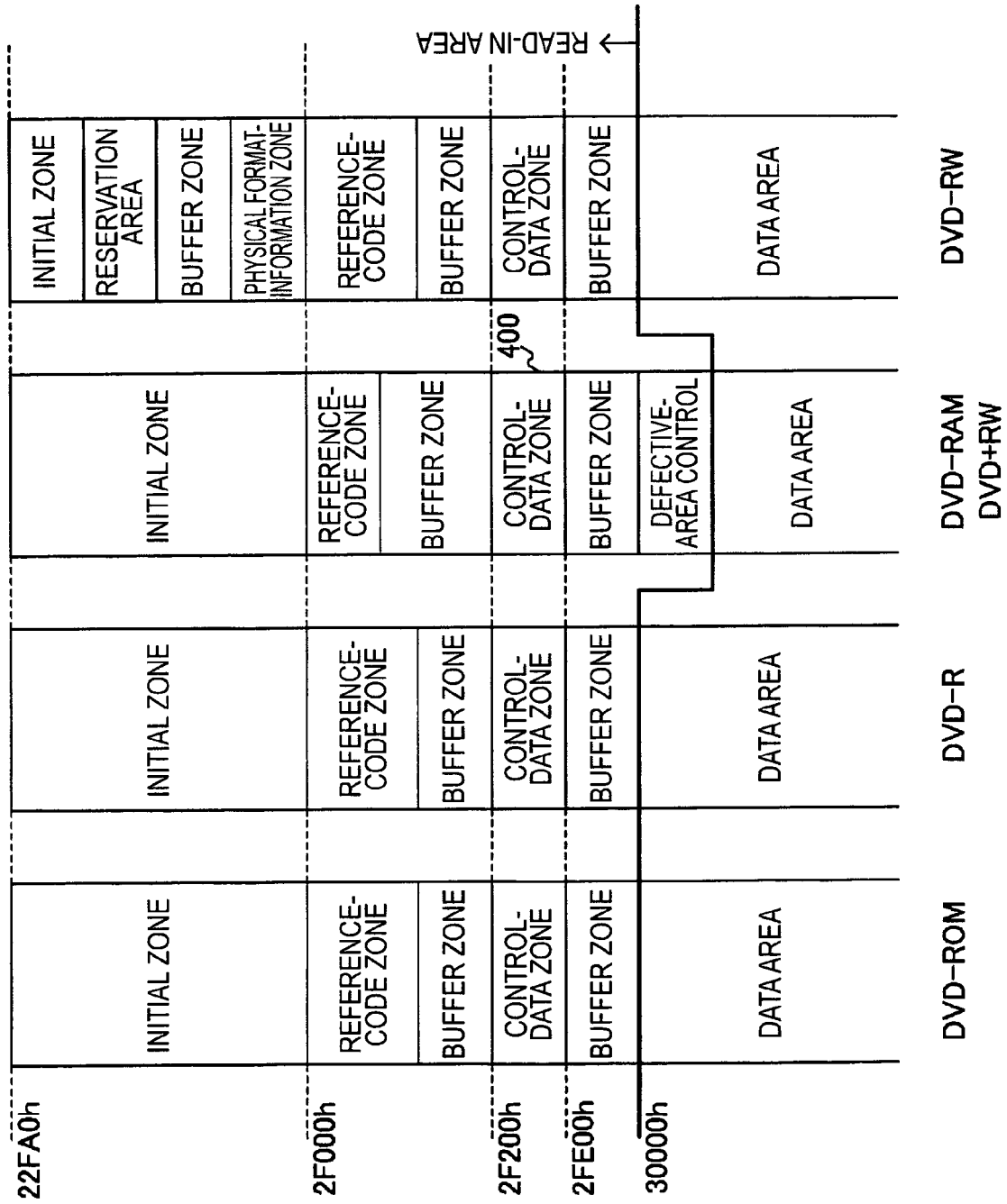
FIG. 3 shows the description of a lead-in area provided on each disk.

FIG. 3 shows the contents of a lead-in area of each of the disks of various types. The disk has a disk-like shape and the lead-in area on the inner-periphery side thereof. Addresses are assigned to the lead-in area from the inner-periphery side. Any of the disks has areas provided thereon in increasing order of size of the address. That is to say, an initial zone, a reference-code zone, a buffer zone, a control-data zone, and a buffer zone are provided on the lead-in area.

Of the above-described areas, a control-data zone 400 provided in an area extending from "2F200h" (the letter h represents that the number shown before the letter h is a hexadecimal digit) to "2FDFFh" stores information about the disk. The address where the control-data zone 400 is provided is common to all of the disks.

Figure 4:
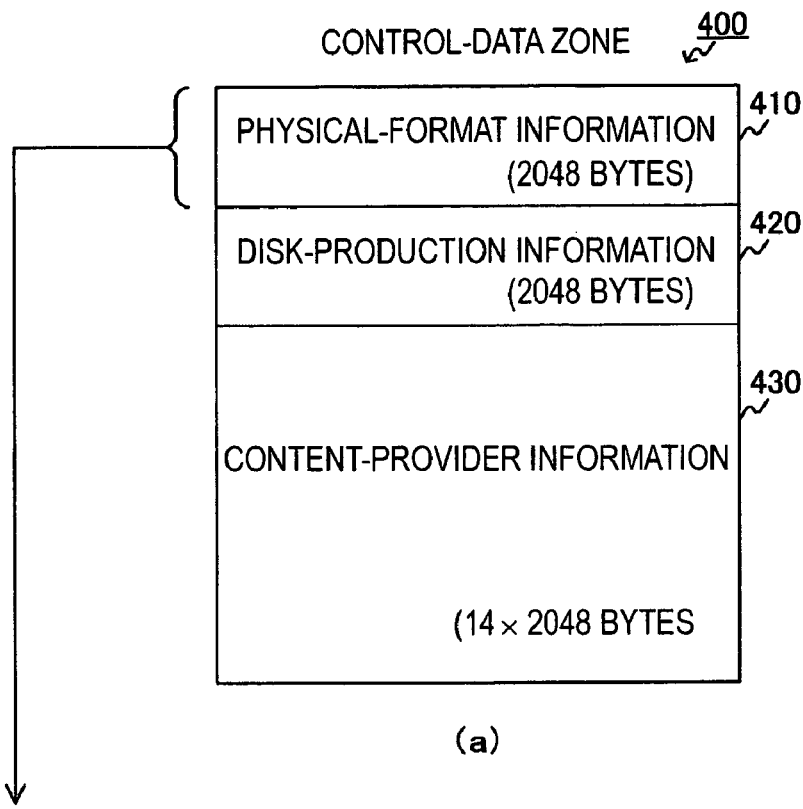
FIG. 4 shows the description of a control data zone 400.

FIG. 4 shows the contents of the control-data zone 400. Referring to FIG. 4(a), the control-data zone 400 includes physical-format information 410 of 2048 bytes, disk-production information 420 of 2048 bytes, and content-provider information 430 of 14×2048 bytes.

Referring to FIG. 4(b), the physical-format information 410 includes disk type-and-version number 411, data size-and-maximum transfer rate 412, disk structure 413, recording density 414, data-zone assignment 415, a BCA descriptor 416, and reservation areas 417 and 418. Of the above-described information items, in the case of the disk type-and-version number 411 corresponding to the first one byte, high-order four bits represent the disk type and low-order four bits represent the version number. That is to say, when the high-order four bits of the disk type-and-version number 411 is shown as "1010b" (the letter b denotes that the number shown before the letter b is a binary number), the disk type is DVD+RW. If the high-order four bits of the disk type-and-version number 411 is shown as "0000b", the disk type is DVD–ROM. Further, if the high-order four bits of the disk type-and-version number 411 is shown as "0010b", the disk type is DVD–R.

Thus, the disk type can be determined by checking the disk type shown in the physical-format information 410 recorded on the lead-in area and the high-order four bits of the version number 411.

Figure 5:
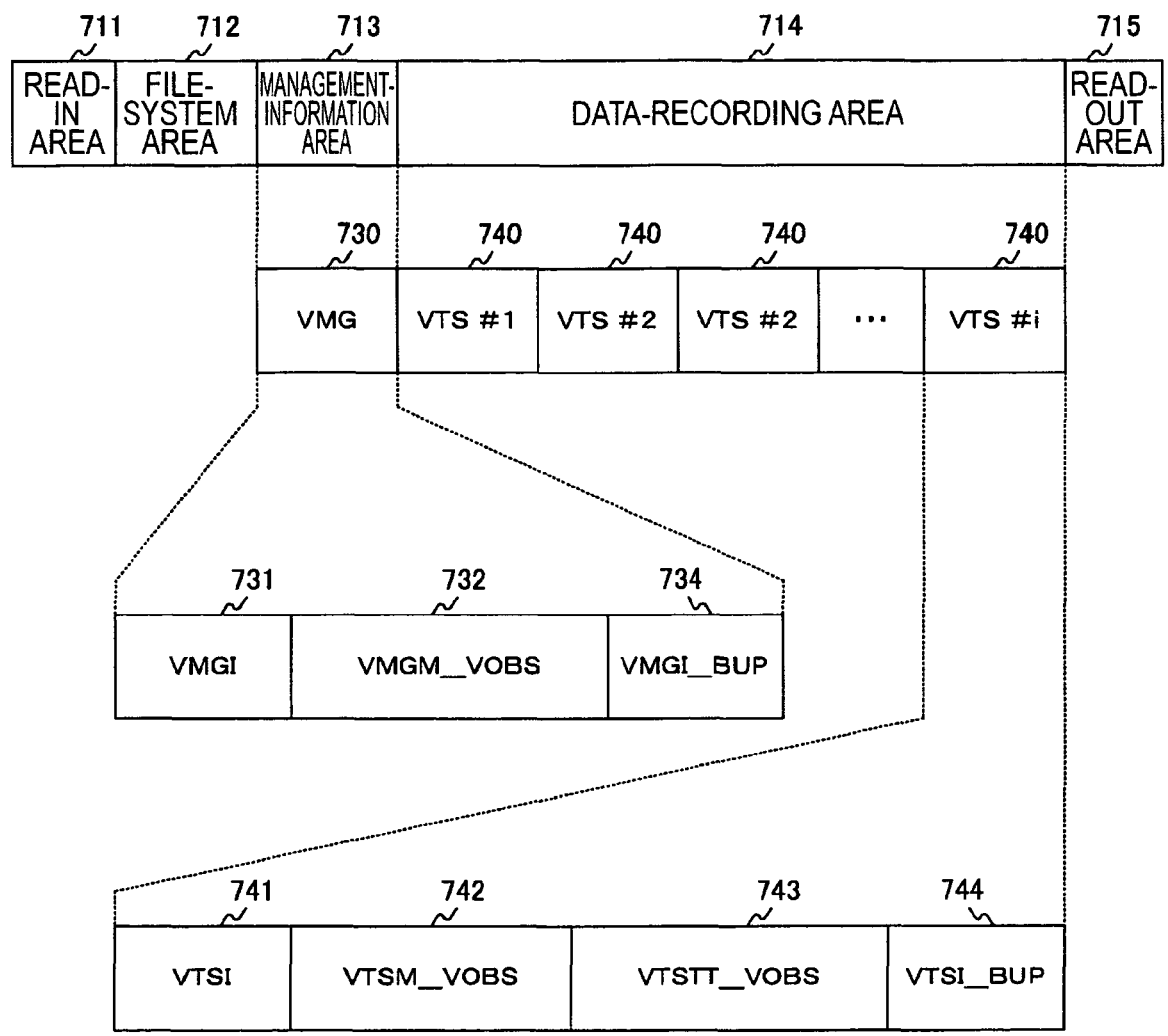
FIG. 5 shows the data structure of a disk generated in the DVD–Video format.

FIG. 5 shows a data configuration of a disk generated in DVD–Video format (DVD+RW-video recording format). The disk has a disk-like shape and a lead-in area 711 on the inner-periphery side thereof and a read-out area 715 on the outer-periphery side thereof. Further, a file-system area 712, a management-information area 713, and a data-recording area 714 are provided in that order on an area extending from the inner-periphery side to the outer-periphery side of the disk. The file-system area 712 is managed by a file system and provided, so as to adhere to ISO 9660 and the universal-disk-format (UDF) standard. The management-information area 713 is an area adapted to hold management information used for the entire video contents recorded onto the disk. The data-recording area 714 is an area adapted to hold the contents of each of the video-title sets and the control information thereof. Further, the above-described areas are divided into logical sectors of 2048 bytes.

The management-information area 713 holds a video manager (VMG) 730. The VMG 730 includes VMG information (VMGI) 731, a video object set-for-VMG menu (VMGM_VOBS) 732, and VMGI for backup (VMGI_BUP) 734. The VMGI 731 holds management information for each of the titles of video contents and top menu-control information that are recorded onto the disk. The VMGM_VOBS 732 holds data on the top menu. Further, the VMGI_BUP 734 is a backup of the VMGI 731.

The data-recording area 714 holds at least one video titles set (VTS) 740. Each VTS 740 includes VTS information (VTSI) 741, a video object set for VTS menu (VTSM_VOBS) 742, a video object set for titles in a VTS (VTSTT_VOBS) 743, and VTSI for backup (VTSI_BUP) 744. The VTSI 741 holds management information and/or control information of each of chapters of a title included in the video title set, control information of a chapter menu, and so forth. The VTSM_VOBS 742 holds data on the chapter menu. The VTSTT_VOBS 743 holds data on the titles included in the video titles set. Further, the VTSI_BUP 744 is a backup of the VTSI 741.

Subsequently, the recording format of the disk can be determined by checking whether or not the recording format adheres to the DVD–Video format (DVD+RW-video recording format). Further, the existence of the DVD menu can be determined by checking whether or not the VMGM_VOBS 732 exists in the VMG 730. Further, the existence of the photo movie can be determined by checking whether or not the last title includes the photo movie. That is to say, the existence of the photo movie can be determined by referring to the VTSI 741 of the VTS 740, where the VTSI 741 corresponds to the last title.

Figure 6:
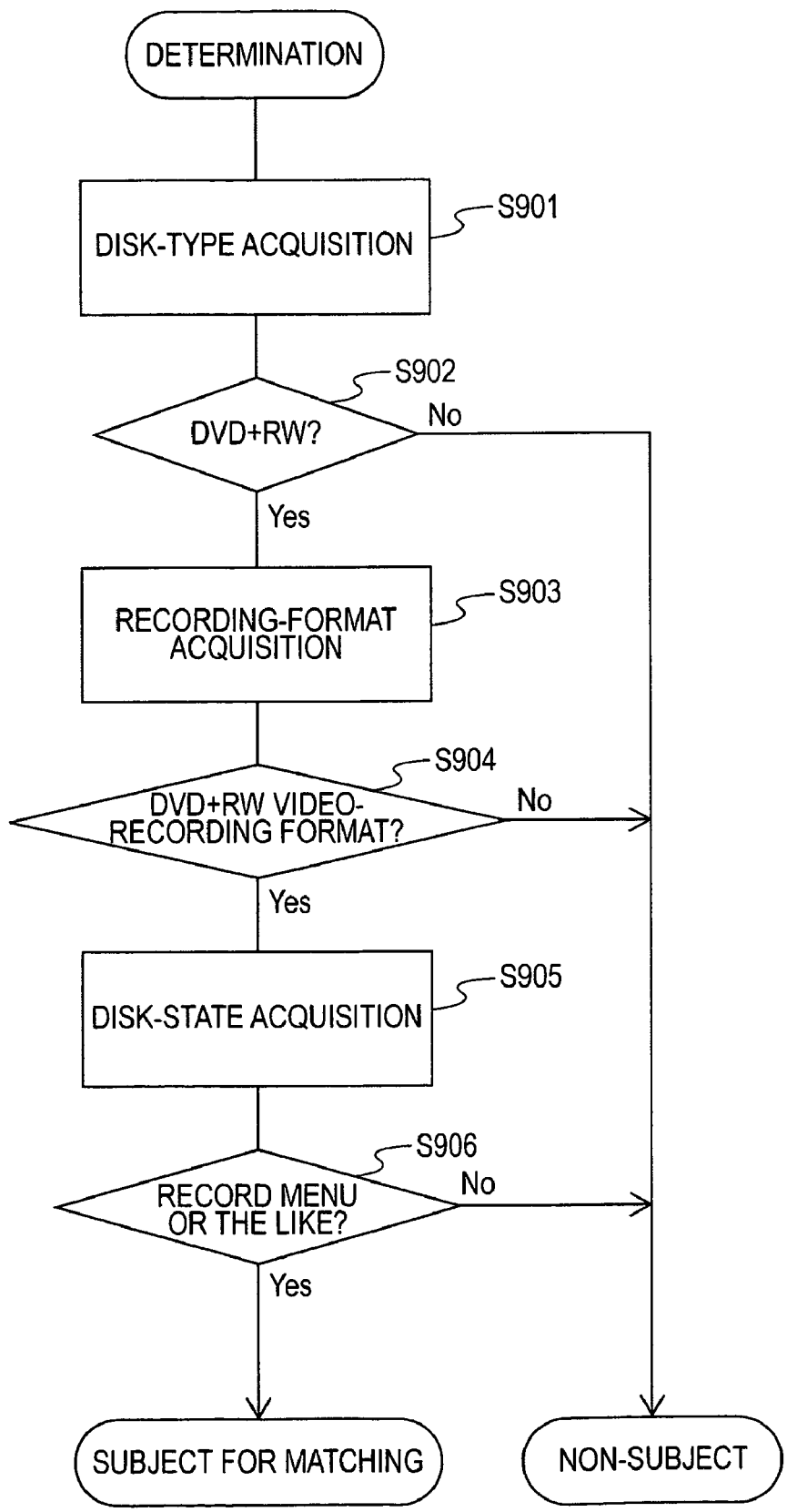
FIG. 6 is a flowchart showing determination procedures performed by a disk-determination unit 260 according to another embodiment of the present invention.

FIG. 6 is a flowchart illustrating the determination steps performed by the disk-determination unit 260 according to the embodiment of the present invention. First, information about the disk type is acquired (step S901). If the disk type is not the DVD+RW, it is determined that the disk should not be subjected to the matching (step S902). Further, if the disk type is the DVD+RW, information about the recording format thereof is acquired (step S903). If the result does not show that the recording format adheres to the DVD+RW-video recording format, it is determined that the disk should not be subjected to the matching (step S904).

Then, if the recording format adheres to the DVD+RW-video recording format, information about the disk state is further acquired (step S905). If the DVD menu and/or the photo movie is not recorded onto the disk, it is determined that the disk should not be subjected to the matching. Otherwise, the disk is determined to be the subject of the matching (step S906).

Next, a first embodiment of an image recording-control method of the present invention will be described.

Figure 7:
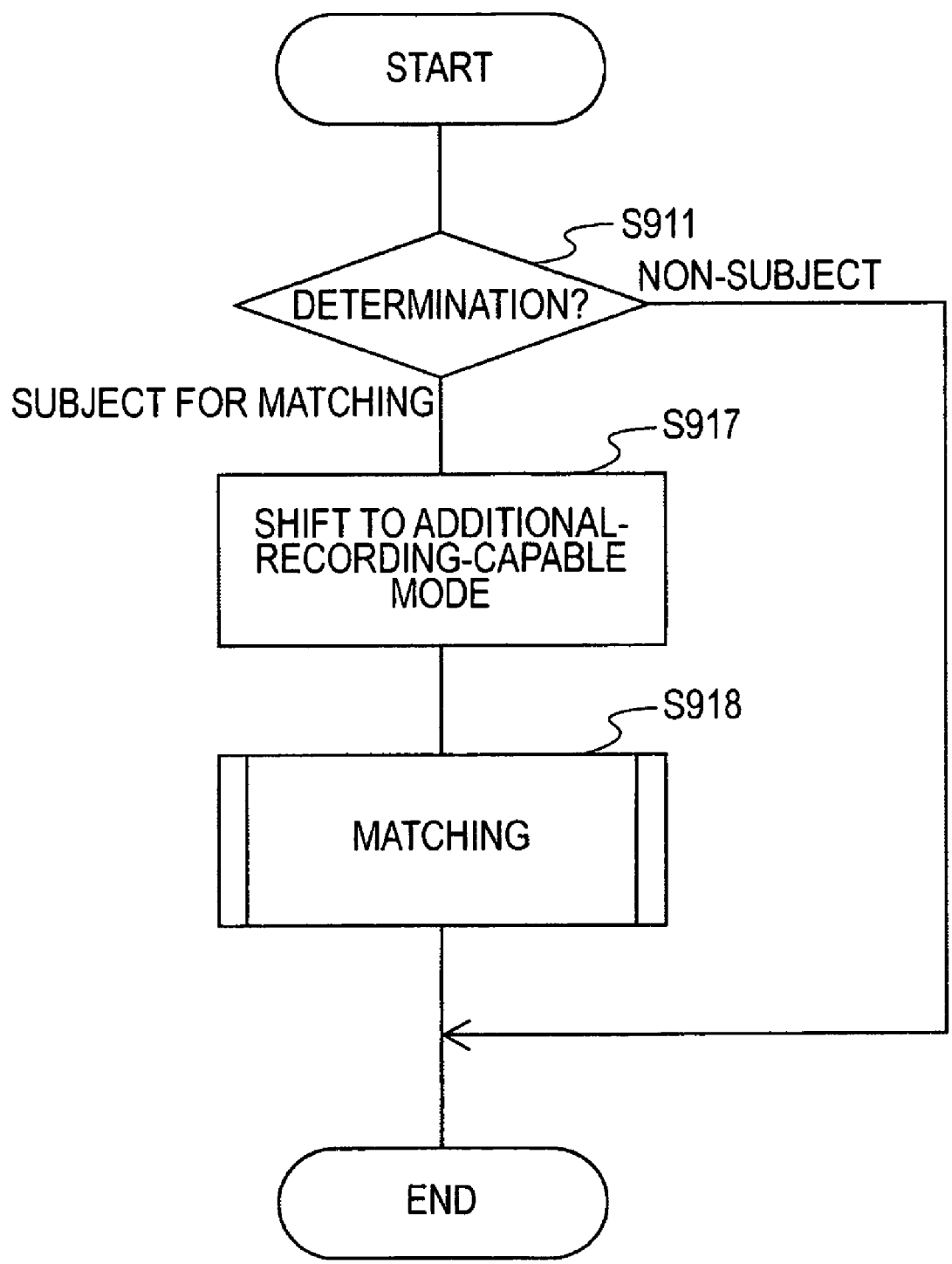
FIG. 7 is a flowchart showing processing procedures performed on the basis of an image recording-control method according to a first embodiment of the present invention.

FIG. 7 is a flowchart showing processing procedures performed on the basis of the image recording-control method according to the first embodiment of the present invention. In the disk-determination unit 260 according to the embodiment of the present invention, it is determined whether or not the inserted disk 49 is the subject disk that is of the predetermined type (namely, the DVD+RW standard) and in the predetermined format (the DVD–video format), and that stores a predetermined menu (the DVD menu and/or the photo movie) (step S911), as described with reference to FIG. 6. If the disk is not determined to be the subject disk then, the remainder of the processing procedures is not performed.

On the other hand, if the disk is determined to be the subject disk, at step S911, a shift to a mode that allows for performing additional recording is made (step S917). More specifically, in the additional recording-mode holding unit 230, settings are made so that the mode that allows for performing the additional recording is selected. Then, the matching is performed under the control of the additional recording-control unit 220 (step S918). The matching can be modified in various ways, as described below.

Figure 8:
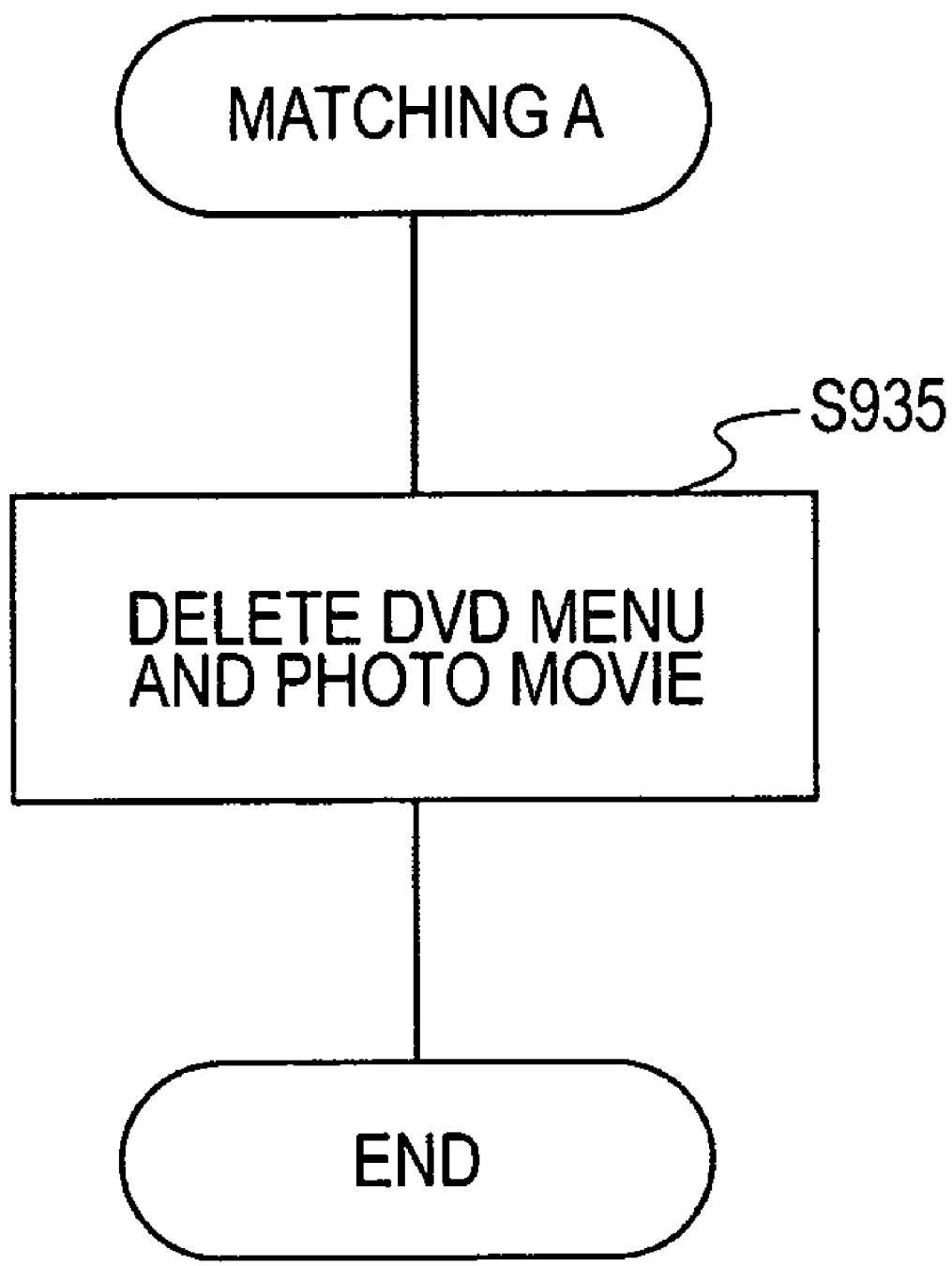
FIG. 8 is a flowchart showing a first example of matching performed according to another embodiment of the present invention.

FIG. 8 is a flowchart showing a first example of the matching according to the embodiment of the present invention. According to the first example of the matching, the DVD menu and the photo movie are deleted unconditionally (step S935), so as to reduce a mismatch which occurs between the DVD menu and/or the photo movie, and the recorded image. According to the first example, however, the DVD menu and the photo movie are deleted irrespective of whether or not the additional recording is performed, which may cause a trouble in some cases. Therefore, according to a second example of the matching, the DVD menu and the photo movie are not deleted until the additional recording is actually performed.

Figure 9:
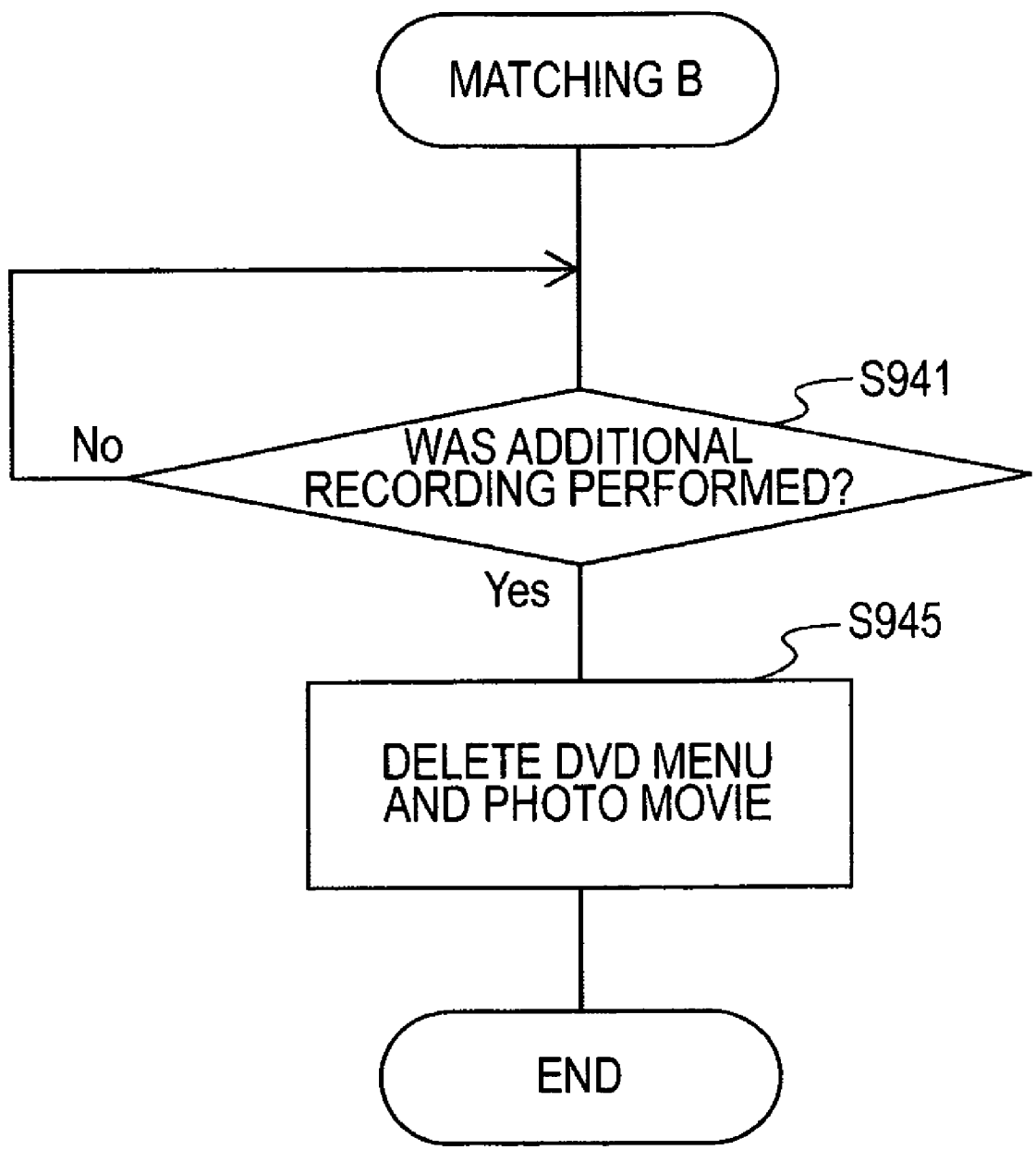
FIG. 9 is a flowchart showing a second example of matching performed according to another embodiment of the present invention.

FIG. 9 is a flowchart illustrating the second example of the matching according to the embodiment of the present invention. According to the second example of the matching, the action of the additional recording is waited for even after shifting to the matching (step S941). The DVD menu and the photo movie are deleted after the additional recording is actually performed (step S945). Subsequently, the DVD menu and the photo movie can be deleted only when the additional recording is actually performed.

Figure 10:
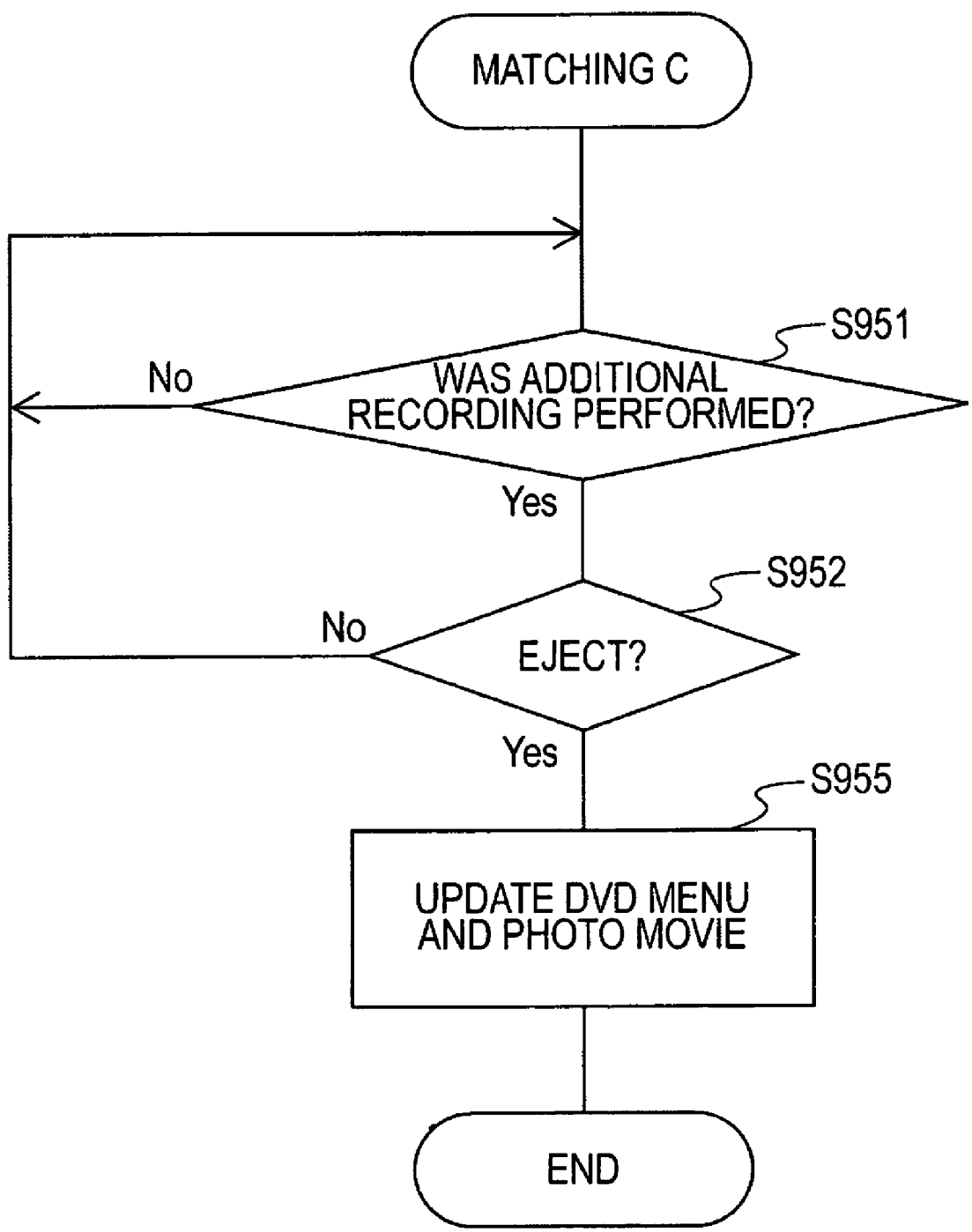
FIG. 10 is a flowchart showing a third example of matching performed according to another embodiment of the present invention.

FIG. 10 is a flowchart illustrating a third example of the matching according to the embodiment of the present invention. According to the third example of the matching, the image-recording device 100 waits until the additional recording is performed even after the image-recording device 100 shifts to the matching (step S951), as is the case with the second example shown in FIG. 9. Further, even though the additional recording is performed, the processing is not performed until the disk for which the additional recording is performed is taken out, that is, ejected (step S952). Then, when the disk is taken out after data is additionally recorded, the DVD menu and the photo movie are updated so that the contents thereof agree with those of the additionally recorded data (step S955).

Figure 11:
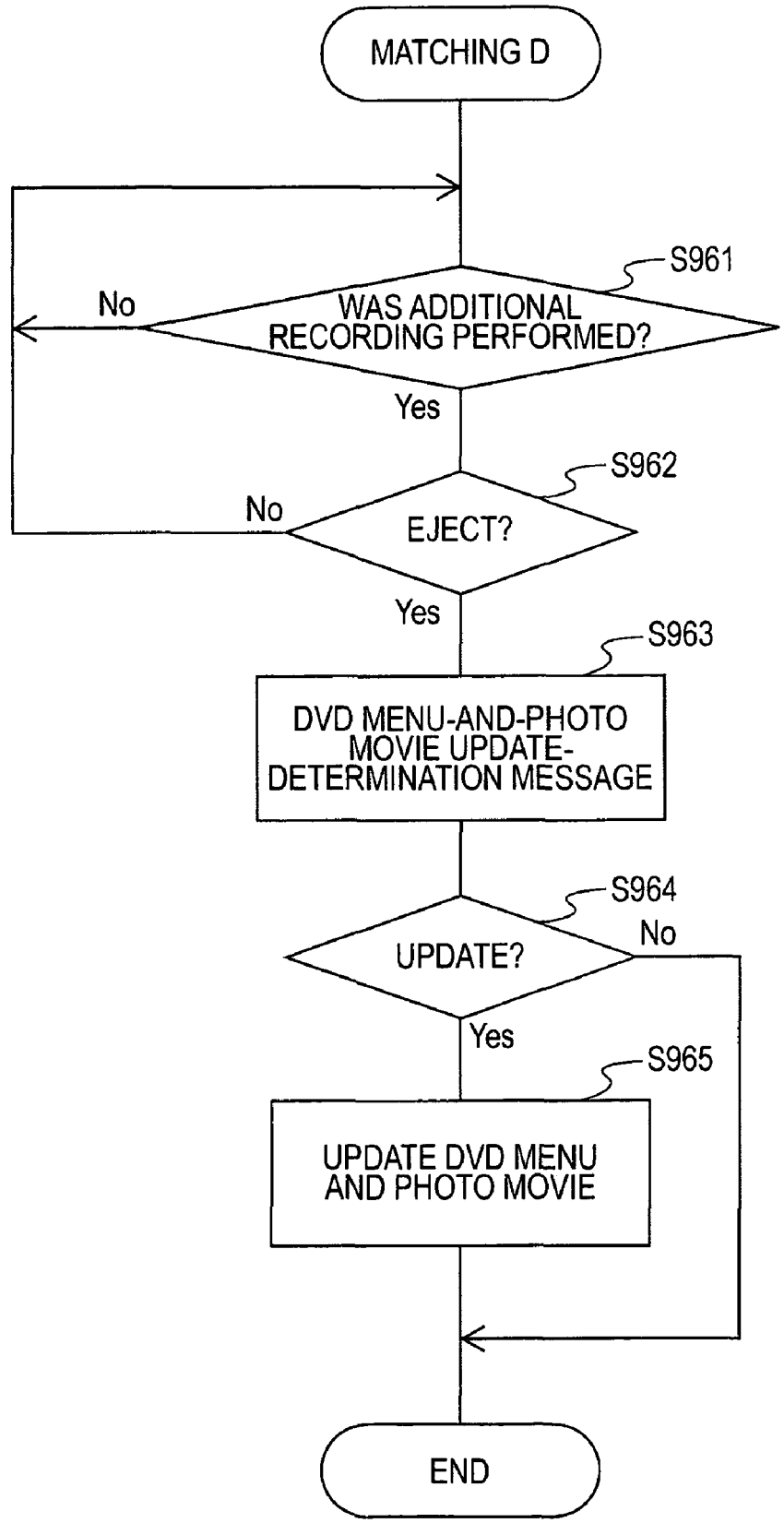
FIG. 11 is a flowchart showing a fourth example of matching performed according to another embodiment of the present invention.

FIG. 11 is a flowchart illustrating a fourth example of the matching according to the embodiment of the present invention. According to the fourth example of the matching, the processing is not performed until the disk is taken out, even though the additional recording was performed, as is the case with the third example shown in FIG. 10 (steps S961 and S962). Then, when the disk is taken out after the additional recording was performed, the message display-control unit 270 makes the display unit 280 produce a message adapted to determine the pros and cons of updating the DVD menu and the photo movie (step S963). Information about details on determination performed by the user is received by the operation input-reception unit 290 and the confirmation-detail information indicates "to update", the DVD menu and the photo movie are updated so that the contents thereof agree with those of the additionally recorded data (step S965). On the other hand, if the confirmation-detail information indicates "not to update", the update is not performed. In that case, the user updates the DVD menu and the photo movie by operating the menu, for example, at a later date. Otherwise, a mismatch occurs between the DVD menu and the photo movie, and the recorded image.

Next, an image recording-control method according to a second embodiment of the present invention will be described.

Figure 12:
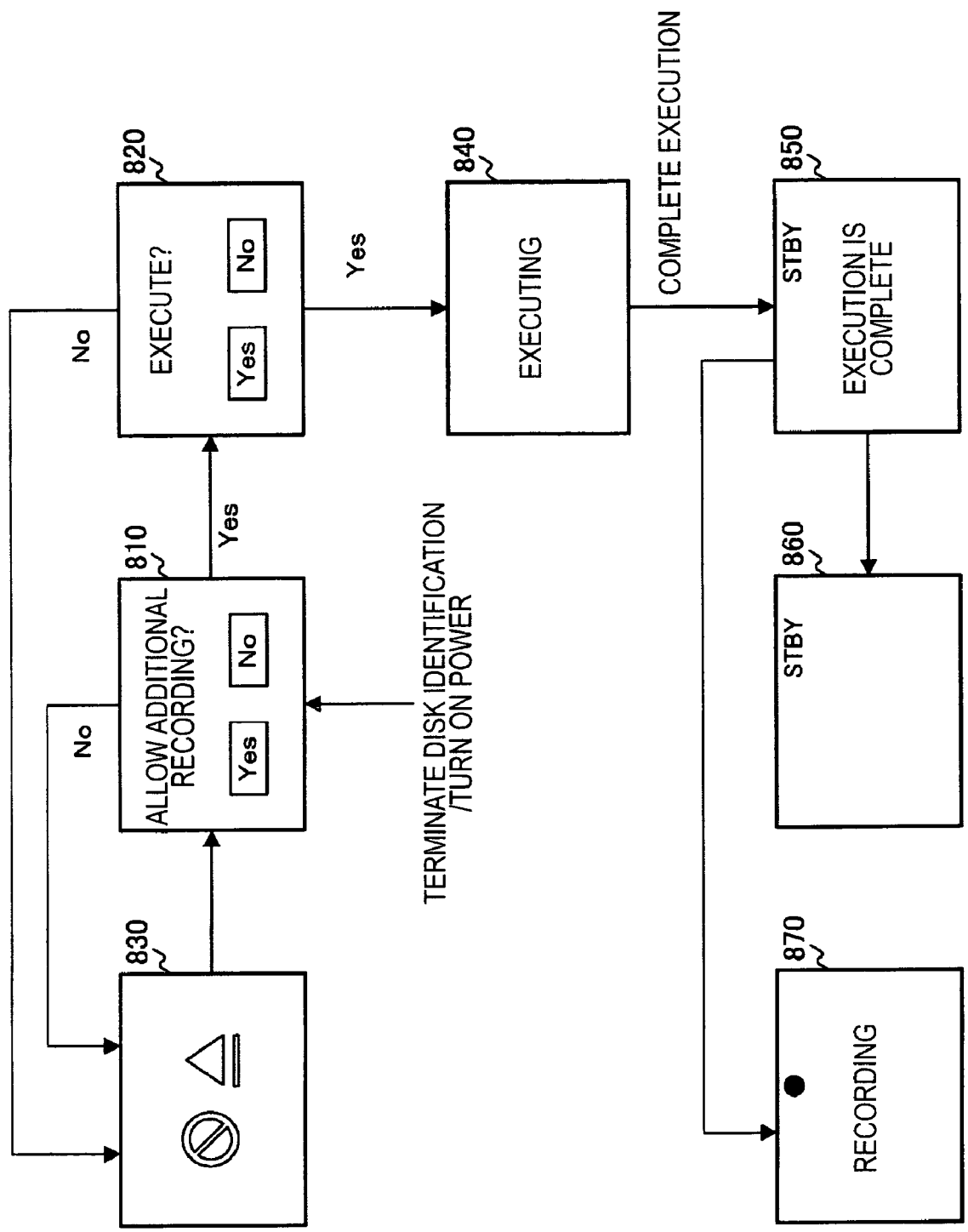
FIG. 12 shows example transitions of a display image, where the transitions are generated according to an image recording-control method according to a second embodiment of the present invention.

FIG. 12 is a flowchart illustrating example transitions of a display image, where the example transitions are made on the basis of the image recording-control method according to the second embodiment of the present invention. According to the first embodiment described with reference to FIG. 7, if the disk is the subject disk, the shift to the additional recording-capable mode is made unconditionally. However, the second embodiment is different from the first embodiment in that the user determines the pros and cons of shifting to the additional recording-capable mode.

Namely, when it is confirmed that the disk is the subject disk, a message screen 810 configured to determine the pros and cons of shifting to the additional recording-capable mode is produced. If the shift to the additional recording-capable mode is confirmed, a screen 840 showing the state of being shifted to the additional recording-capable mode is produced after a confirmation message screen 820 is produced again, and a screen 850 indicating that the shift is completed is produced. After the shift to the additional recording-capable mode is achieved, a screen 860 indicating the standby state, or a screen 870 indicating that recording is being performed when a recording operation is performed is produced.

On the other hand, when the shift to the additional recording-capable mode is rejected in the confirmation screens 810 and 820, a screen 830 is produced, so as to indicate that the additional recording is prohibited. If the power is turned off and the turned again in the above-described state, the message screen 810 adapted to confirm the pros and cons of shifting to the additional recording-capable mode is produced again. Further, if the operation input-reception unit 290 receives an instruction to switch between photographing modes including a video-photographing mode, a still image-photographing mode, an external-input mode, a disk-photographing mode, a memory-photographing mode, and so forth, the message screen 810 adapted to confirm the pros and cons of shifting to the additional recording-capable mode is produced again. Further, if the operation input-reception unit 290 is informed that a video recording-start button, a still image-photographing button, and/or an external input-image recording button are pressed down, the message screen 810 adapted to confirm the pros and cons of shifting to the additional recording-capable mode is produced again.

Figure 13:
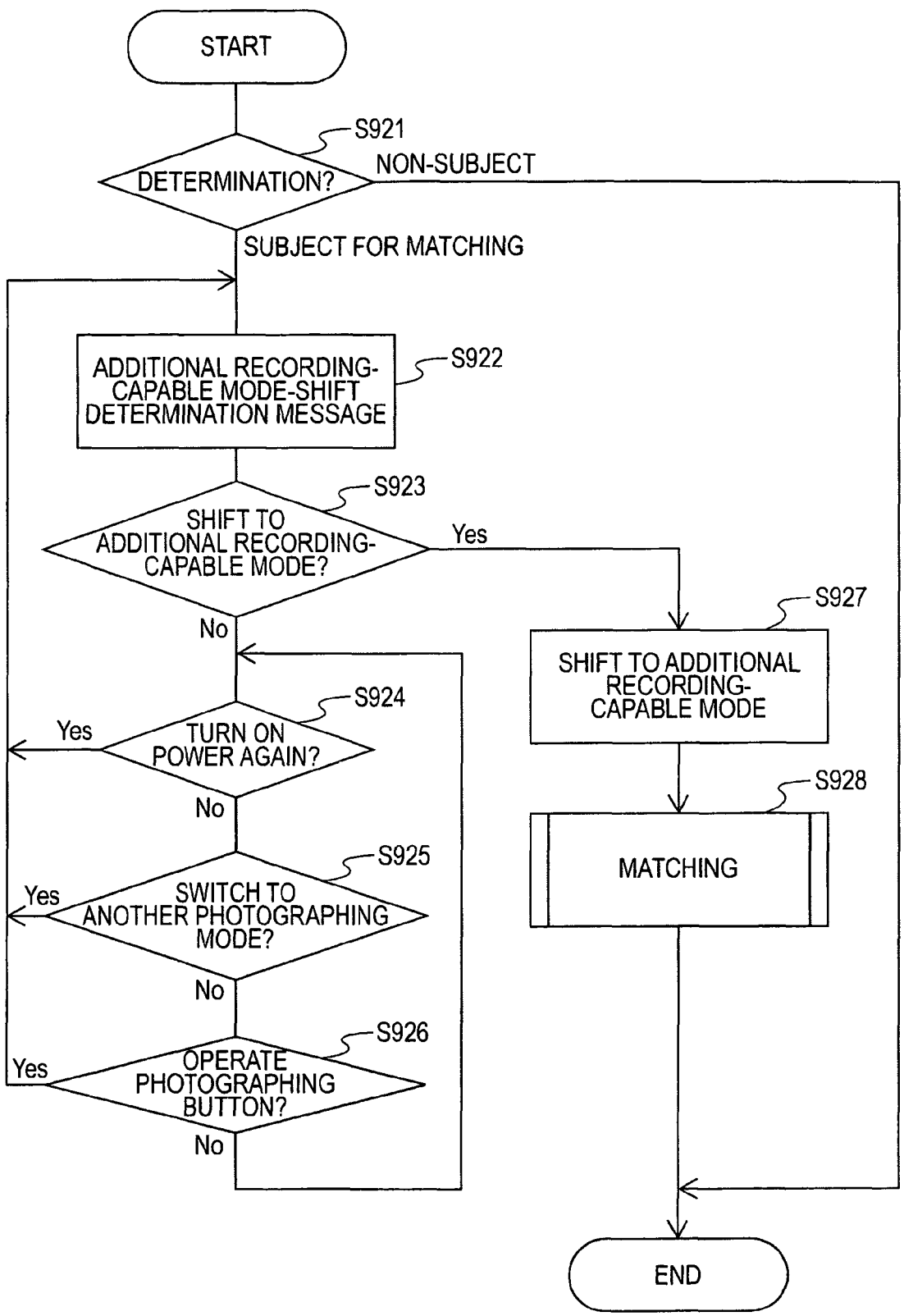
FIG. 13 is a flowchart illustrating processing procedures performed on the basis of the image recording-control method according to the second embodiment of the present invention.

FIG. 13 is a flowchart illustrating processing procedures performed on the basis of the image recording-control method according to the second embodiment of the present invention. In the disk-determination unit 260 according to the embodiment of the present invention, it is determined whether or not the inserted disk 49 is the subject disk that is of the predetermined type (namely, the DVD+RW standard) and in the predetermined format (the DVD+video format), and that stores a predetermined menu (the DVD menu and/or the photo movie) (step S921). If the disk is not determined to be the subject disk then, the remainder of the processing procedures is not performed.

On the other hand, if the disk is determined to be the subject disk, at step S921, the message display-control unit 270 makes the display unit 280 produce an image of a message used for determining the pros and cons of shifting to the additional recording-capable mode (step S922). Information about details on the determination performed by the user is received by the operation input-reception unit 290 (step S923) and the confirmation-detail information indicates "to shift", the shift to the additional recording-capable mode is made (step S927). More specifically, in the additional recording-mode holding unit 230, settings are made so that the mode allows for performing the additional recording. Then, the matching is performed under the control of the additional recording-control unit 220 (step S928). The matching is the same as that performed at step S918 shown in FIG. 7 and can be modified in various ways, as has been described with reference to FIGS. 8 to 11.

On the other hand, if the confirmation-detail information indicates "not to shift", at step S923, the additional recording is prohibited. In that case, however, if the power is turned off for a time and the turned again (step S924), a message adapted to determine the pros and cons of shifting to the additional recording-capable mode is produced again (step S922). Further, if the operation input-reception unit 290 receives the instruction to switch between photographing modes including the video-photographing mode, the still image-photographing mode, the external-input mode, the disk-photographing mode, the memory-photographing mode, and so forth, (step S925), the message adapted to determine the pros and cons of shifting to the additional recording-capable mode is produced again (step S922). Further, if the operation input-reception unit 290 is informed that the video recording-start button, the still image-photographing button, and/or the external input-image recording button are pressed down (step S926), the message adapted to determine the pros and cons of shifting to the additional recording-capable mode is produced again (step S922).

Thus, unlike the first embodiment wherein the DVD menu and the photo movie are deleted unconditionally, the second embodiment allows for performing the matching after the user determines the pros and cons of shifting to the additional recording-capable mode. Therefore, it becomes possible to reduce data deletion unexpected by the user.

Further, according to the embodiments of the present invention, the DVD menu and the photo movie are deleted and/or updated, so as to reduce a mismatch between the DVD menu and the photo movie, and the recorded image. Without being limited to the above-described embodiments, the present invention may reduce the mismatch by using other methods. For example, the mismatch can be reduced by providing a simple-operation mode so that the additional recording for the subject disk is uniformly prohibited. That is to say, as shown in FIG. 14, information indicating that recording is prohibited all the time when the DVD menu and the photo movie are recorded may be shown, and information indicating that the recording is prohibited when the record button is pressed down may be shown. In that case, the user manually deletes the DVD menu and the photo movie so that the additional recording can be performed.

Further, each of the embodiments of the present invention shows an example adapted to epitomize the present invention, and there are correspondences between the embodiments and items determining the present invention, where the items fall within the scope of claims of the present invention. However, without being limited to the correspondences, the embodiments may be modified in various ways without leaving the spirit of the present invention.

Namely, in the case of Claims 1, 2, and 20, disk-determination means corresponds to the disk-determination unit 260, for example. Further, additional recording-control means corresponds to the additional recording-control unit 220, for example.

Further, in the case of Claim 8, message display-control means corresponds to the message display-control unit 270, for example. Further, operation input-reception means corresponds to the operation input-reception unit 290, for example.

Further, in the case of Claim 9, disk-determination means corresponds to the disk-determination unit 260, for example. Further, additional recording-control means corresponds to the additional recording-control unit 220, for example. Further, message display-control means corresponds to the message display-control unit 270, for example. Further, operation input-reception means corresponds to the operation input-reception unit 290, for example.

Further, in the case of Claim 9, disk-determination means corresponds to the disk-determination unit 260, for example. Further, additional recording-control means corresponds to the additional recording-control unit 220, for example.

Further, in the case of Claim 22 and/or Claim 24, a step for determining the type of an inserted disk corresponds to step S902, for example. Further, a step for determining whether or not a predetermined menu is recorded onto the inserted disk corresponds to step S906, for example. Further, step S918 corresponds to a step for performing matching for additionally recorded data if the type of the inserted disk is DVD+RW and the predetermined menu is recorded onto the inserted disk, for example.

Further, in the case of Claim 23 and/or Claim 25, a step for determining the type of an inserted disk corresponds to step S902, for example. Further, a step for determining whether or not a predetermined menu is recorded onto the inserted disk corresponds to step S906, for example. Further, step S922 corresponds to a step for producing a confirmation display image indicating that data can be additionally recorded onto the inserted disk if it is determined that the type of the inserted disk is DVD+RW and the predetermined menu is recorded onto the inserted disk, for example. Further, a step for receiving a confirmation input for the confirmation display image corresponds to step S923, for example. Further, step S928 corresponds to a step for performing matching for the additionally recorded data if the confirmation input indicates that the additional recording can be performed, for example.

Further, the processing procedures described in the embodiments of the present invention may be construed as a method including the above-described series of procedures. Further, the processing procedures may be construed as a program adapted to make a computer execute the above-described series of procedures and/or a recording medium storing the program.

In the image-recording device using a disk-type recording medium generated under the DVD+RW standard, the present invention can produce the effect of reducing a mismatch which may occur between video data generated by using the DVD menu and/or the still-image data recorded onto the disk, and the image data.

INDUSTRIAL APPLICABILITY

As an example utilization of the present invention, in the case of an image-recording device using a disk-type recording medium generated under the DVD+RW standard or the like, the present invention can be used for performing additional recording after video data is generated by using a DVD menu and/or still-image data recorded onto the disk, for example.

The invention claimed is:

1. An image-recording device comprising:
a disk-determination unit configured to determine that an inserted disk is a subject disk by determining that the inserted disk is of a predetermined type and that the inserted disk stores a predetermined menu;
an additional recording-mode control unit configured to set a mode for indicating whether additional recording onto the inserted disk is allowed; and
an additional recording-control unit configured to update the predetermined menu based on additionally-recorded data when the disk-determination unit determines the inserted disk to be the subject disk and the additional recording-mode control unit indicates that additional recording is allowed.

2. An image-recording device comprising:
a disk-determination unit configured to determine that an inserted disk is a subject disk by determining that the inserted disk is of a DVD+RW type, that the inserted disk has a predetermined recording format, and that the inserted disk stores a predetermined menu;
an additional recording-mode control unit configured to set a mode, for indicating whether additional recording onto the inserted disk is allowed, only when the inserted disk is determined to be the subject disk; and
an additional recording-control unit configured to update the predetermined menu based on additionally-recorded data when the disk-determination unit determines the inserted disk to be the subject disk and the additional recording-mode control unit indicates that additional recording is allowed.

3. An image-recording device according to claim 2, wherein the disk-determination unit determines the inserted disk to be the subject disk when the predetermined recording format of the inserted disk is a DVD+RW video-recording format.

4. An image-recording device according to claim 2, wherein the predetermined menu is a DVD menu holding a list of video data items recorded onto the inserted disk.

5. An image-recording device according to claim 2, wherein the predetermined menu is video data generated by using the still-image data recorded onto the inserted disk.

6. An image-recording device according to claim 2, wherein the additional recording-control unit deletes the predetermined menu when the additional data is recorded onto the inserted disk.

7. An image-recording device according to claim 2, wherein, when the additional data is recorded onto the inserted disk and an instruction to take out the inserted disk is issued, the additional recording-control unit updates the predetermined menu on the basis of the additionally recorded data.

8. An image-recording device according to claim 2, further comprising:
a message display-control unit configured to show a predetermined message; and
an operation input-reception unit configured to receive a predetermined operation input,
wherein when the additional data is recorded onto the inserted disk and an instruction to take out the inserted disk is issued, the additional recording-control unit makes the message display-control unit show the predetermined message to confirm that the predetermined menu is to be updated and updates the predetermined menu on the basis of the additionally recorded data when the operation input-reception unit receives update-confirmation information.

9. An image-recording device comprising:
a disk-determination unit configured to determine that an inserted disk is a subject disk by determining that the inserted disk is of a DVD+RW type, that the inserted disk has a predetermined recording format, and that the inserted disk stores a predetermined menu;
a message display-control unit configured to produce a display image, the display image being adapted to confirm whether additional data is allowed to be recorded onto the inserted disk when the disk-determination unit determines the inserted disk to be the subject disk;
an operation input-reception unit configured to receive a confirmation input for the display image indicating whether the additional data is allowed to be recorded;

an additional recording-mode control unit configured to set a mode for indicating whether additional recording onto the inserted disk is allowed based on the confirmation input; and an additional recording-control unit configured to update the predetermined menu for the additionally-recorded data when the additional recording-mode control unit sets a mode indicating that additional recording is allowed.

10. An image-recording device according to claim 9, wherein the disk-determination unit determines the inserted disk to be the subject disk when the predetermined recording format of the inserted disk is a DVD+RW-video recording format.

11. An image-recording device according to claim 9, wherein the predetermined menu is a DVD menu holding a list of video data items recorded onto the inserted disk.

12. An image-recording device according to claim 9, wherein the predetermined menu is video data generated by using still-image data recorded onto the inserted disk.

13. An image-recording device according to claim 9, wherein the additional recording-control unit deletes the predetermined menu.

14. An image-recording device according to claim 9, wherein the additional recording-control unit deletes the predetermined menu when the additional data is recorded onto the inserted disk.

15. An image-recording device according to claim 9, wherein, when the additional data is recorded onto the inserted disk and an instruction to take out the inserted disk is issued, the additional recording-control unit updates the predetermined menu on the basis of the additionally recorded data.

16. An image-recording device according to claim 9, wherein when the additional data is recorded onto the inserted disk and an instruction to take out the inserted disk is issued, the additional recording-control unit controls the message display-control unit to show information adapted to confirm that the predetermined menu is to be updated and updates the predetermined menu on the basis of the additionally recorded data when the operation input-reception unit receives the update-confirmation. information.

17. An image-recording device according to claim 9, wherein when the confirmation input indicates that the additional data cannot be recorded, the message display-control unit causes the display image to be produced again, the display image being adapted to confirm whether or not the additional data is allowed to be recorded when a power is turned again.

18. An image-recording device according to claim 9, wherein when the confirmation input indicates that the additional data cannot be recorded, the message display-control unit causes the display image to be produced again, the display image being adapted to confirm whether or not the additional data is allowed to be recorded when a shift to a predetermined photographing mode is made.

19. An image-recording device according to claim 9, wherein when the confirmation input indicates that the additional data cannot be recorded, the message display-control unit causes the display image to be produced again, the display image being adapted to confirm whether or not the additional data is allowed to be recorded when a predetermined photographing operation is performed.

20. An image-recording device comprising:
a disk-determination unit configured to determine that an inserted disk is a subject disk by determining that the inserted disk is a subject disk that is of a DVD+RW type, that the inserted disk has a predetermined recording format, and that the inserted disk stores a predetermined menu;

an additional recording-mode control unit configured to set a mode for indicating whether additional recording onto the inserted disk is allowed; and an additional recording-control unit configured to disable additional recording when the disk-determination unit determines the inserted disk to be the subject disk and the additional recording-mode control unit indicates that additional recording is prohibited.

21. An image-recording device according to claim 20, wherein the disk-determination unit determines the inserted disk to be the subject disk when the predetermined recording format of the inserted disk is a DVD+RW-video recording format.

22. An image recording-control method comprising:
determining a type of an inserted disk;
determining whether or not a predetermined menu is recorded onto the inserted disk;
determining that the inserted disk is a subject disk by determining that the type of the inserted disk is DVD+RW and that the predetermined menu is recorded onto the inserted disk;
setting a mode indicating whether additional recording onto the inserted disk is allowed; and
updating the predetermined menu based on additionally recorded data when the inserted disk is determined to be the subject disk and the mode indicates that additional recording onto the inserted disk is allowed.

23. An image recording-control method:
determining a type of an inserted disk;
determining a recording format of the inserted disk:
determining whether or not a predetermined menu is recorded onto the inserted disk;
producing a display image adapted to confirm whether or not additional data is allowed to be recorded onto the inserted disk when it is determined that the type of the inserted disk is DVD+RW, the recording format of the inserted disk is a DVD+RW-video recording format, and the predetermined menu is recorded onto the inserted disk;
receiving a confirmation input for the display image indicating whether the additional data is allowed to be recorded;
setting a mode for indicating whether additional recording onto the inserted disk is allowed based on the confirmation input: and
updating the predetermined menu based on the additionally-recorded data when the mode indicates that additional recording onto the inserted disk is allowed.

24. A non-transitory computer-readable medium comprising instructions executable by a computer processor to implement a method for image recording control, the method comprising:
determining a type of an inserted disk;
determining whether or not a predetermined menu is recorded onto the inserted disk;
determining that the inserted disk is a subject disk when the type of the inserted disk is DVD+RW and when the predetermined menu is recorded onto the inserted disk;
setting a mode indicating whether additional recording onto the inserted disk is allowed; and
updating the predetermined menu based on additionally recorded data when the inserted disk is determined to be the subject disk and the mode indicates that additional recording onto the inserted disk is allowed.

25. A non-transitory computer-readable medium comprising instructions executable by a computer processor to implement a method for image recording control, the method comprising:
- determining a type of an inserted disk;
- determining a recording format of the inserted disk:
- determining whether or not a predetermined menu is recorded onto the inserted disk;
- producing a display image adapted to confirm whether additional data is allowed to be recorded onto the inserted disk when it is determined that the type of the inserted disk is DVD+RW, the recording format of the inserted disk is a DVD+RW-video recording format, and the predetermined menu is recorded onto the inserted disk;
- receiving a confirmation input for the display image indicating whether the additional data is allowed to be recorded;
- setting a mode indicating whether additional recording onto the inserted disk is allowed based on the confirmation input; and
- updating the predetermined menu based on the additionally recorded data when the mode indicates that additional recording onto the inserted disk is allowed.

* * * * *